United States Patent [19]

Mandella

[11] Patent Number: 4,567,597
[45] Date of Patent: Jan. 28, 1986

[54] HIGH POWER LASER SYSTEM

[76] Inventor: Michael J. Mandella, 460-B Tyrella Ave., Mountain View, Calif. 94043

[21] Appl. No.: 434,491

[22] Filed: Oct. 15, 1982

[51] Int. Cl.$^4$ .............................................. H01S 3/04
[52] U.S. Cl. ...................................... 372/34; 372/61; 372/66; 372/92
[58] Field of Search ....................... 372/34, 33, 61, 66, 372/69, 70, 92

[56] References Cited

U.S. PATENT DOCUMENTS 4,099,143  7/1978  Foster .................................... 372/34

Primary Examiner—William L. Sikes
Assistant Examiner—Léon Scott, Jr.
Attorney, Agent, or Firm—Flehr, Hohbach, Test, Albritton & Herbert

[57] ABSTRACT

A laser system including a lasing medium (gas, liquid or solid) in an annular configuration with means defining a stationary lasing region in a portion of the lasing medium and means for rotating the lasing medium to rotate heated portions of the medium into heat exchange relationship with the surrounds for cooling and bringing cooled portions of the medium into the lasing region.

13 Claims, 6 Drawing Figures

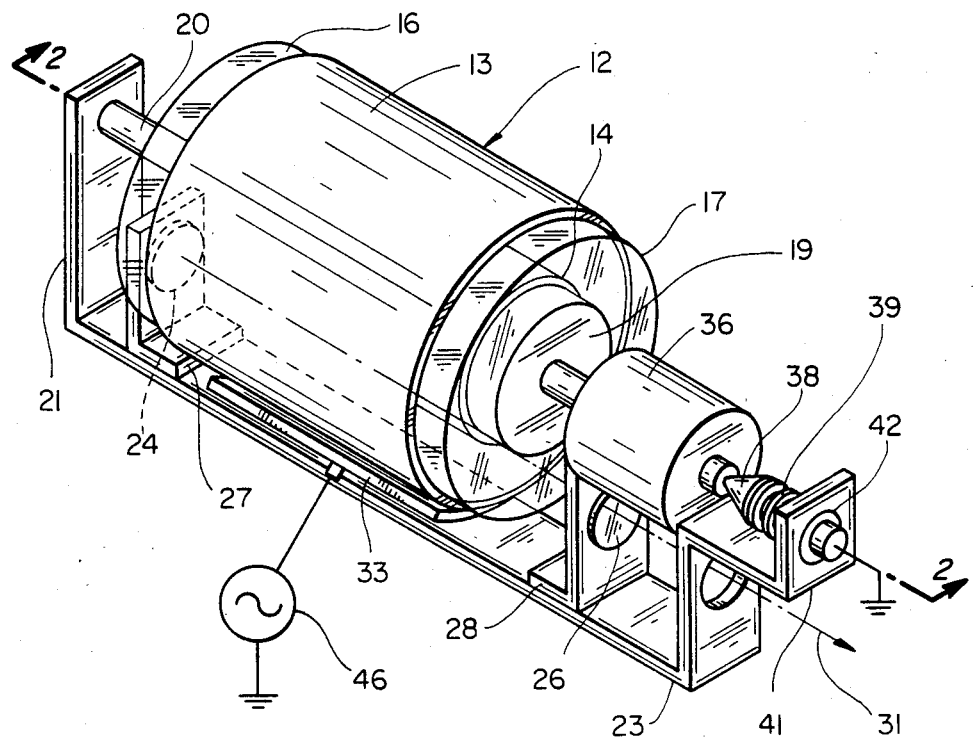
FIG__1
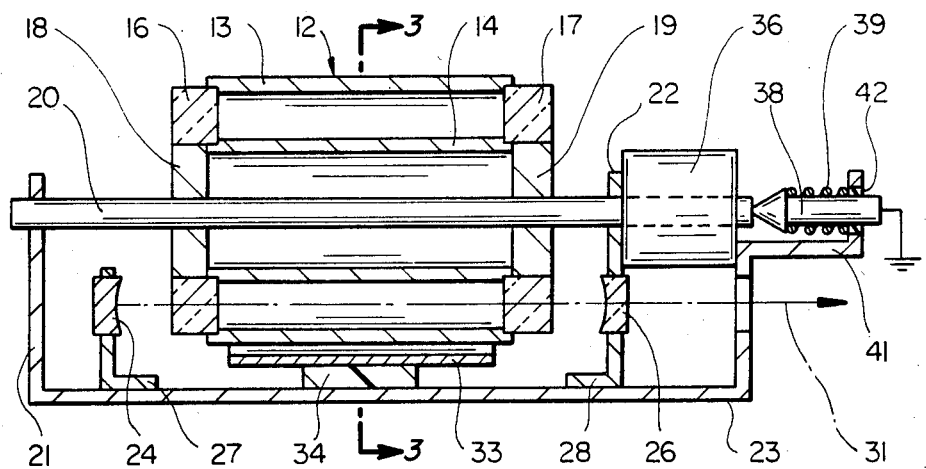
FIG__2

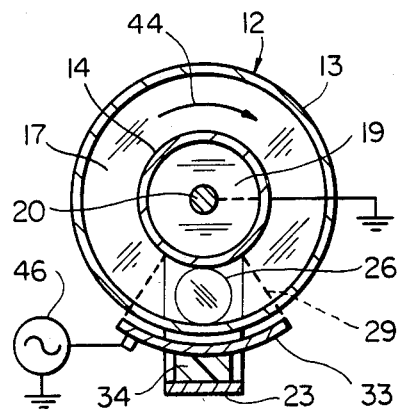
FIG_3
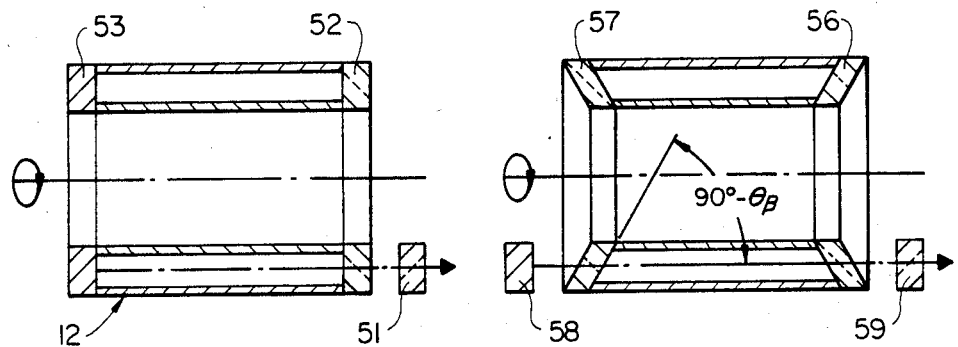
FIG_4  FIG_5
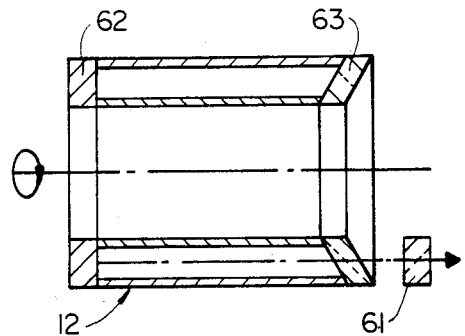
FIG_6

HIGH POWER LASER SYSTEM

This invention relates to a high power laser system and more particularly to a laser including a moving lasing medium whereby cool medium is moved into the lasing region while the heated medium is moved out of the lasing region to be cooled.

In a gas laser the excitation of the lasing gases transfers energy to the gases and heats them. Excessive gas temperatures have detrimental effects upon the laser. Thus, the excitation is limited because of the heating and consequently the output power obtainable from the gas laser is limited.

One prior art technique for achieving high power continuous gas laser operation has been to circulate cool gases through the active or excited region of the laser to replace the heated excited gases. In a closed gas laser system this has been accomplished by placing blowers and heat exchangers inside the closed systems to move the heated gases from the lasing region by forced convection, circulating the gases through a heat exchanger where they are cooled and then recirculating the gases into the excited region. U.S. Pat. No. 4,242,646 describes a gas laser which employs a spiral cooling fin design to achieve gas transport and heat removal in a CO2 laser.

Excitation of the gases in the active laser region is usually accomplished by coupling electromagnetic energy of suitable magnitude and frequency, ranging from audio frequencies to optical frequencies, into the gases from a suitably positioned source such that the gases within the active regions are excited for subsequent laser action as the gases flow through the region. The laser cavity is formed by placing reflectors at either end of the excitation region to define a resonant cavity with the reflector on at least one end made partially transmissive so that a laser beam is projected from the laser.

In U.S. Pat. No. 4,185,254 there is disclosed an annular laser having an elongated centrally located flash lamp enclosed in a quartz tube serving to excite laser gases associated therewith. Adjustable and interchangeable exterior reflectors define a laser cavity in the annular space surrounding the quartz tube forming the flash lamp envelope. No means are shown for circulating or cooling the gases within the envelope except for thermal diffusion through the envelope walls.

It is an object of the present invention to provide an improved high power laser.

It is another object of the present invention to provide a closed laser which is simple in construction and operation.

It is a further object of the present invention to provide a high power laser which is simple in construction and efficient in operation.

It is another object of the present invention to provide an annular laser in which the excited heated lasing medium is cooled by rotating the envelope to bring the medium into heat exchange relationship with the surrounds while cooled medium is brought into the lasing region.

It is another object of the present invention to provide an annular laser in which a portion of the annulus defines the excited region of the lasing medium and the optical resonant cavity while the remainder of the annular portion is cooled and the annular laser is continuously rotated to bring cooled medium into the excited region.

The foregoing and other objects of the invention are achieved by providing a rotating annular laser having an annular lasing medium with reflectors forming a resonant cavity within a portion of the annular medium, the medium in said portion is suitably excited and the laser is rotated to bring heated medium into heat exchange relationship with the surrounds for cooling before being rotated back into the cavity portion.

The foregoing and other features of the invention will be more clearly understood from the following description taken in connection with the accompanying drawings in which:

FIG. 1 is a perspective schematic view of a laser system in accordance with the present invention;

FIG. 2 is a sectional view taken generally along the lines 2—2 of FIG. 1;

FIG. 3 is a sectional view generally along the line 3—3 of FIG. 2; and

FIGS. 4, 5 and 6 show various mirror and window arrangements for defining the resonant cavity.

The preferred embodiment comprises a gas laser. In general the laser comprises a rotating gas containing annular chamber or envelope 12 defined by the outer cylindrical body 13 and concentric inner body 14. The inner and outer envelopes 13 and 14 are suitably sealed to and supported in spaced concentric relationship by windows 16 and 17. Hubs 18 and 19 engage the inner periphery of the windows 16 and 17 and are supported on shaft 20 journaled in the space supports 21 and 22 extending upwardly from base 23 whereby the envelope may be rotated about its axis. The base 23 also independently supports mirrors 24 and 26 on brackets 27 and 28. The mirrors or reflectors 24, 26 define a resonant cavity in the envelope portion 29, FIG. 3. The reflectors 24, 26 have a suitable curvature to define the resonant area 29. The mirror 24 is substantially totally reflective while the mirror 26 is semi-transparent whereby energy formed by lasing within the lasing cavity 29 defined by the two mirrors can travel outwardly through the mirror 26 and provide useful laser radiation 31.

The inner cylindrical envelope portion 14 is conductive and forms one electrode of an excitation means which includes a second curved electrode 33 exterior to and adjacent the outer wall 13 whereby application of voltage between the envelope portion 14 and the electrode 33 creates a discharge in the lasing region 29 which serves to excite the gases and provide the lasing energy in the lasing cavity and the emission of the monochromatic laser radiation 31. The electrode 33 is supported on the base 23 by an insulating spacer 34.

The mounting base 23 serves to mount motive means such as motor 36 which engages the shaft 20 and rotates the laser envelope. Rotation of the envelope causes the gases within the envelope to rotate bringing new cool gases into the lasing region while the heated gases are moved into heat transfer relationship with the remainder of outer and inner envelope walls 13, 14 where energy is removed from the gases by conduction, convection and radiation from the envelope to the surrounds.

Suitable means are provided for establishing the voltage which creates the discharge. Electrical connection is made to the envelope 14 through the shaft 20 and hubs 18, 19. Electrical connection is made to the shaft by the contact 38 which is urged against the shaft by spring 39. The contact is held on mounting plate 41 by an insulating bushing 42.

Briefly, operation of the laser comprises rotating the envelope whereby the gas in the annular chamber is rotated by rotating walls of the chamber about their axis. This causes mass transport of the gases in a closed path about the axis in the direction of rotation of the envelope such as shown by arrow 44, FIG. 3. The gases rotate through the stationary excitation region. Suitable power is applied between the electrode 33 and envelope 14 to cause a discharge. The power source 46 schematically shows the excitation source.

The facing mirrors or reflectors 24, 26 define an optical cavity whereby the excited inverted energy state of the gases provide laser action. The heated gases in the excitation region are moved out of the region by rotation of the envelope and they communicate with the envelope walls 13 and 14 where they transfer heat energy to the walls and to the surrounds. By appropriately selecting the rotational velocity of the envelope and the excitation energy a balance can be reached whereby the laser can stably operate with relatively high output laser power.

The embodiment just described includes spaced stationary mirrors 24, 26 defining the optical cavity and rotating windows 16, 17 confining the lasing medium. It is apparent that the lasing cavity can be defined by other combinations of windows and reflectors. Referring to FIG. 4 the lasing cavity is defined by a stationary mirror 51 and rotating mirror 53 which also defines a wall for the chamber. The chamber is completed by window 52. FIG. 5 shows windows 56 and 57 at Brewster's angle with mirrors 58 and 59 defining the cavity. FIG. 6 shows a stationary mirror 61, rotating mirror 62 forming the end of the chamber and Brewster's angle window 63. Other combinations are possible the foregoing is only illustrative.

The glow discharge described is between electrode 33 and conductive cylinder 14. It is apparent that a stationary electrode could be disposed adjacent the cylinder 14 which can be non-conductive. The outer cylinder 13 can be conductive with an inner electrode adjacent non-conductive cylinder 14. In any event means are provided for exciting a region of the annular lasing medium.

The description of the preferred embodiment has been confined to the description of a gas laser. It is apparent that the gas can be replaced by a liquid medium, dye, etc. or a solid medium, Nd: YAG, etc., in which cooled portions of the medium are moved into the lasing region while heated portions are brought into heat exchange relationship with the surrounds for cooling. The pumping source could be in a flash lamp disposed to provide energy into the envelope or a laser projecting energy along the axis of the lasing region.

Thus, there has been provided a high power laser which is simple in construction and operation and efficient.

What is claimed:

1. A high power laser comprising an annular lasing medium contained within an envelope having transparent end walls means defining a resonant region in an active portion of said annular lasing medium between said transparent end walls means for exciting said active portion of said resonant region of said annular lasing medium and for generating a population inversion in said active portion of said resonant region;

means for rotating said annular lasing medium such that a non-excited or cooled portion of sad lasing medium is rotated into said resonant region and said excited active portion of said excited lasing medium is rotated out of said resonant region to transfer heat generated during excitation of said active portion of said lasing medium to the surrounds.

2. A high power laser as in claim 1 in which said lasing medium is a solid.

3. A high power laser as in claim 2 in which said excitation means is a laser.

4. A high power laser as in claim 1 in which said lasing medium is a liquid.

5. A high power laser as in claim 4 in which said excitation means is a source of optical radiation which produces a population inversion.

6. A high power laser as in claim 1 in which said lasing medium is a gas.

7. A high power laser as in claim 6 in which said excitation means includes a electrical discharge.

8. A high power laser comprising an annular envelope defined by spaced cylindrical walls sealed to end walls a fluid lasing medium contained in said envelope means cooperating with said end walls to define a resonant region in a portion of said envelope, means for exciting the fluid lasing medium to generate a population inversion in said resonant region of the fluid lasing medium and means for rotating the envelope whereby the fluid lasing medium is moved from the excited region of the envelope to other regions for cooling by heat exchange through the envelope walls to the surrounds.

9. A high power laser as in claim 8 in which the fluid lasing medium is a gas.

10. A high power laser as in claim 9 in which the means for exciting the lasing medium is electrical discharge.

11. A high power laser as in claim 8 in which said envelope end walls are sufficiently transparent and/or reflective to form said resonant region.

12. A high power laser as in claim 8 in which the fluid lasing medium is a liquid.

13. A high power laser as in claim 10 in which said spaced cylindrical walls are sufficiently conductive to form an electrical discharge.

* * * * *